United States Patent
Liu et al.

(10) Patent No.: US 10,811,211 B1
(45) Date of Patent: Oct. 20, 2020

(54) CARBON NANOTUBE FIELD EMITTER AND PREPARATION METHOD THEREOF

(71) Applicants: Tsinghua University, Beijing (CN); HON HAI PRECISION INDUSTRY CO., LTD., New Taipei (TW)

(72) Inventors: Peng Liu, Beijing (CN); Duan-Liang Zhou, Beijing (CN); Chun-Hai Zhang, Beijing (CN); Li Qian, Beijing (CN); Yu-Quan Wang, Beijing (CN); Xue-Wei Guo, Beijing (CN); Li-Yong Ma, Beijing (CN); Fu-Jun Wang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/661,141

(22) Filed: Oct. 23, 2019

(30) Foreign Application Priority Data

Jul. 16, 2019 (CN) .......................... 2019 1 0642109

(51) Int. Cl.
*H01J 9/02* (2006.01)
*H01J 1/304* (2006.01)
*B32B 7/12* (2006.01)
*B32B 9/00* (2006.01)
*B32B 37/12* (2006.01)
*B32B 38/00* (2006.01)
*B32B 3/30* (2006.01)

(52) U.S. Cl.
CPC ............... *H01J 9/025* (2013.01); *B32B 3/30* (2013.01); *B32B 7/12* (2013.01); *B32B 9/007* (2013.01); *B32B 37/1284* (2013.01); *B32B 38/0004* (2013.01); *B32B 38/0008* (2013.01); *H01J 1/3042* (2013.01); *B32B 2250/02* (2013.01); *B32B 2255/00* (2013.01); *B32B 2313/04* (2013.01); *B32B 2457/00* (2013.01)

(58) Field of Classification Search
CPC .............................................. H01J 2203/0232
See application file for complete search history.

(56) References Cited

U.S. PATENT DOCUMENTS

| 6,630,772 | B1 * | 10/2003 | Bower | ................... H01J 1/304 313/309 |
| 2007/0103048 | A1 * | 5/2007 | Liu | ........................ B82Y 10/00 313/311 |

\* cited by examiner

*Primary Examiner* — Joseph L Williams
*Assistant Examiner* — Jacob R Stern
(74) *Attorney, Agent, or Firm* — ScienBiziP, P.C.

(57) ABSTRACT

A method for making a carbon nanotube field emitter is provided. A carbon nanotube array and a cathode substrate are provided. The carbon nanotube array is heated to form a graphitized carbon nanotube array. A conductive adhesive layer is formed on a surface of the cathode substrate. One end of the graphitized carbon nanotube array is contact with the conductive adhesive layer. The conductive adhesive layer is solidified to fix the graphitized carbon nanotube array on the cathode substrate.

9 Claims, 2 Drawing Sheets

CARBON NANOTUBE FIELD EMITTER AND PREPARATION METHOD THEREOF

CROSS-REFERENCE TO RELATED APPLICATIONS

This application claims all benefits accruing under 35 U.S.C. § 119 from China Patent Application No. 201910642109.8 filed on Jul. 16, 2019, in the China National Intellectual Property Administration, the contents of which are hereby incorporated by reference. This application is related to commonly-assigned applications entitled, "CARBON NANOTUBE FIELD EMITTER AND PREPARATION METHOD THEREOF", filed Oct. 23, 2019 (Ser. No. 16/661,148); "CARBON NANOTUBE FIELD EMITTER AND PREPARATION METHOD THEREOF", filed Oct. 23, 2019 (Ser. No. 16/661,152).

FIELD

The present disclosure relates to an evaporating source for a carbon nanotube field emitter and preparation method thereof.

BACKGROUND

In recent years, with the deepening of research on carbon nanotubes and nanomaterials, its broad application prospects are constantly emerging. For example, due to the unique electromagnetic, optical, mechanical, and chemical properties of the carbon nanotubes, a large number of applications have been reported related to their applications in field emission electron sources, sensors, new optical materials, and soft ferromagnetic materials.

Taking the field emission technology as an example, the carbon nanotube field emitter generally includes a cathode substrate and a carbon nanotube layer as an emission material formed on the cathode substrate. The carbon nanotube field emitter can be applied in the fields of field emission plane display, vacuum electron source and the like. Conventionally, a method for making a carbon nanotube field emitter includes the steps of: firstly, providing a cathode substrate and forming a catalyst layer on a surface of the cathode substrate, and then the carbon nanotubes are grown on the cathode substrate by a chemical vapor deposition method to directly form a carbon nanotube field emitter. However, since a binding force between the carbon nanotube array grown directly on the cathode substrate and the cathode substrate is poor, and the carbon nanotubes in the carbon nanotube array have growth defects, the finally formed carbon nanotube field emitter has poor stability and short life.

BRIEF DESCRIPTION OF THE DRAWINGS

Implementations of the present technology will now be described, by way of example only, with reference to the attached figures.

DETAILED DESCRIPTION

Figure 1:
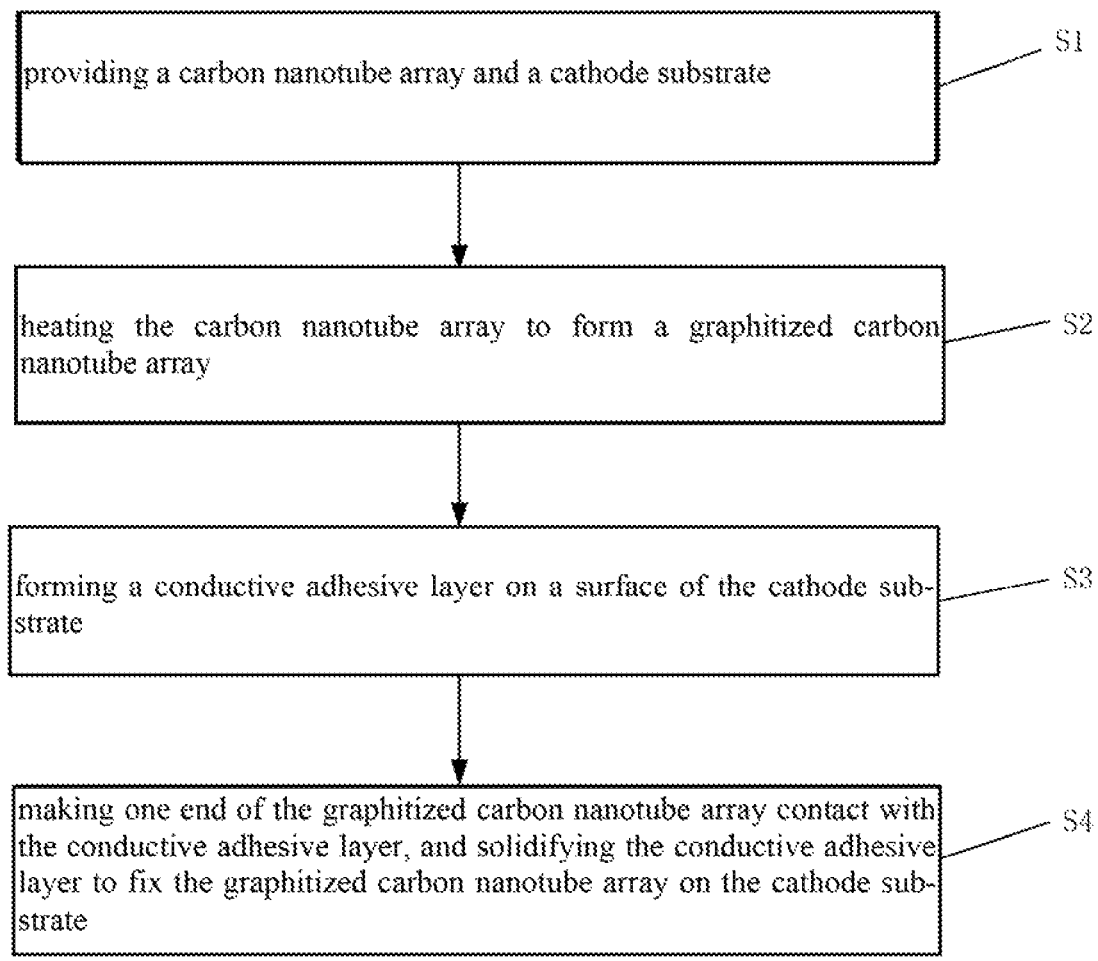
FIG. 1 is a flowchart of one embodiment of a method for making a carbon nanotube field emitter.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one".

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to illustrate details and features of the present disclosure better.

Several definitions that apply throughout this disclosure will now be presented.

The term "comprise" or "comprising" when utilized, means "include or including, but not necessarily limited to"; it specifically indicates open-ended inclusion or membership in the so-described combination, group, series, and the like.

Referring to FIG. 1, one embodiment is described in relation to a method for making a carbon nanotube field emitter. The method comprises steps of:

step (S1), providing a carbon nanotube array and a cathode substrate;

step (S2), heating the carbon nanotube array to form a graphitized carbon nanotube array;

step (S3), forming a conductive adhesive layer on a surface of the cathode substrate; and step (S4), making one end of the graphitized carbon nanotube array contact with the conductive adhesive layer, and solidifying the conductive adhesive layer to fix the graphitized carbon nanotube array on the cathode substrate.

In step (S1), the carbon nanotube array is formed on a growth substrate. In one embodiment, the carbon nanotube array is a super-aligned carbon nanotube array.

The super-aligned carbon nanotube array can be formed by the following substeps: (S11) providing a substantially flat and smooth substrate; (S12) forming a catalyst layer on the substrate; (S13) annealing the substrate with the catalyst layer in air at a temperature ranging from about 700° C. to about 900° C. for about 30 to 90 minutes; (S14) heating the substrate with the catalyst layer to a temperature ranging from about 500° C. to about 740° C. in a furnace with a protective gas therein; and (S15) supplying a carbon source gas to the furnace for about 5 to 30 minutes and growing the super-aligned carbon nanotube array on the substrate.

In step (S11), the substrate can be a P-type silicon wafer, an N-type silicon wafer, or a silicon wafer with a film of silicon dioxide thereon. In one embodiment, a 4-inch P-type silicon wafer is used as the substrate.

In step (S12), the catalyst can be made of iron (Fe), cobalt (Co), nickel (Ni), or any alloy thereof.

In step (S14), the protective gas can be made up of at least one of nitrogen (N2), ammonia ($NH_3$), and a noble gas.

In step (S15), the carbon source gas can be a hydrocarbon gas, such as ethylene ($C_2H_4$), methane ($CH_4$), acetylene ($C_2H_2$), ethane ($C_2H_6$), or any combination thereof.

The carbon nanotube array comprises a plurality of carbon nanotubes, and the plurality of carbon nanotubesare parallel to each other and perpendicular to the growth substrate. The carbon nanotube array formed under the above conditions is essentially free of impurities such as carbonaceous or residual catalyst particles.

Further, the method comprises steps of removing the growth substrate of the carbon nanotube array. The growth substrate can be removed by chemical etching or by pulling directly by external force.

In step (S2), the carbon nanotube array is heated to form the graphitized carbon nanotube array 20 by the following substeps: (S21) placing the carbon nanotube array in a graphite crucible and then placing the graphite crucible in a graphitization furnace; (S22) heating the carbon nanotube array to a temperature ranging from about 2000° C. to about 3000° C. for about 10 to 300 minutes in the graphite furnace with an inert gas; (S23) cooling the graphite furnace to a room temperature t to form the graphitized carbon nanotube array 20. Then, the graphitized carbon nanotube array 20 can be took out of the graphite furnace. In one embodiment, the carbon nanotube array is placed in the graphite crucible and then the graphite crucible is placed in the graphitization furnace, then the carbon nanotube array is heated to about 2800° C. for about 60 minutes under argon gas protection, and the temperature is cooled to room temperature to form the graphitized carbon nanotube array 20. The graphitized carbon nanotube array 20 is then taken out of the graphitization furnace.

The heat treatment of the carbon nanotube array can remove high temperature volatile impurities (such as metal catalysts) in the carbon nanotube array to form a graphitized carbon nanotube array, and eliminate microscopic structural defects.

Figure 2:
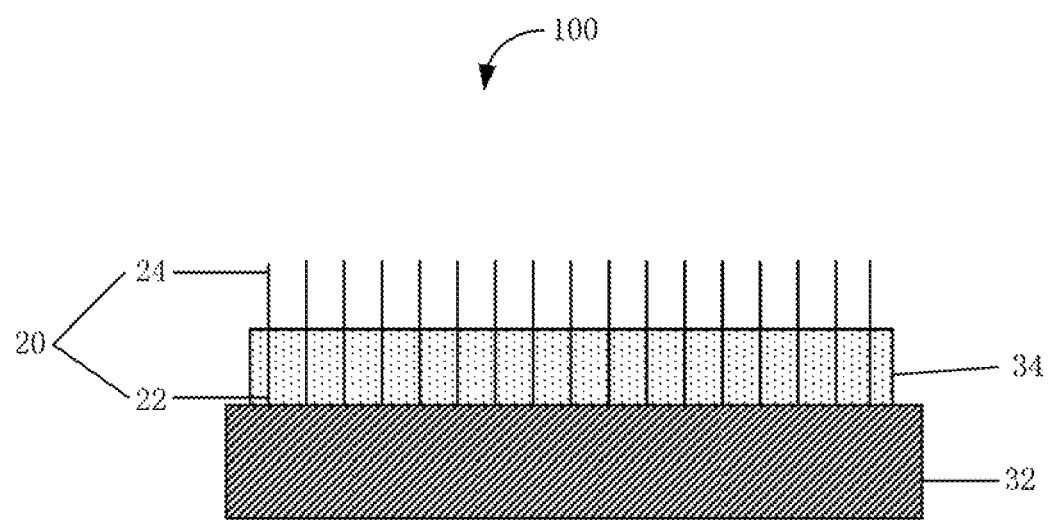
FIG. 2 is a side view of one embodiment of the carbon nanotube field emitter.

In step (S3), referring to FIG. 2, a cathode substrate 32 is provided, and a conductive adhesive layer 34 is formed on the surface of the cathode substrate 32. The cathode substrate 32 is formed by a conductive material, such as, gold, silver, copper, or nickel. The conductive adhesive layer 34 may be selected from a conductive material such as a conductive silver paste or the like. In one embodiment, the conductive adhesive layer 34 is a conductive silver paste. The conductive adhesive layer 34 is formed on the surface of the cathode substrate 32 by surface coating or screen printing or the like. A predetermined electrode pattern can be formed on the cathode substrate 32 by screen printing method.

In step (S4), referring to FIG. 2, the graphitized carbon nanotube array 20 comprises opposing a first end 22 and a second end 24 in the extend direction of the carbon nanotubes. The graphitized carbon nanotube array 20 is fixed on the cathode substrate 32 by the following substeps: (S41) facing the graphitized carbon nanotube array 20 opposite the conductive adhesive layer 34, and making the first end 22 contact with the conductive adhesive layer 34 and immersing at least one portion of the first end 22 in the conductive adhesive layer 34; (S42) providing a solidifying device and solidifying the graphitized carbon nanotube array 20 immersed in the conductive adhesive layer 34 and the cathode substrate 32.

The viscosity of the conductive adhesive layer 34 is such that the graphitized carbon nanotube array 20 does not detach from the graphitized carbon nanotube array 20. In one embodiment, the conductive adhesive layer has a viscosity in the range of 50 to 200 mPa·s. The solidifying temperature is ranged from about 400° C. to 550° C. After the conductive adhesive layer 34 is solidified, the graphitized carbon nanotube array 20 is fixed on the cathode substrate 32 and electrically connected to the cathode substrate 32. In one embodiment, t at least one portion of the first end 22 of the graphitized carbon nanotube array 20 is immersed in the conductive adhesive layer 34. In another embodiment, the first end 22 of the graphitized carbon nanotube array 20 is in direct contact with the cathode substrate 32 through the conductive adhesive layer 34.

Further, after step S4, the method comprises a step of: cutting the graphitized carbon nanotube array 20 with a laser.

The laser controlled by computer can control the illumination path of the laser beam, thus the laser can cut the second end 24 of the graphitized carbon nanotube array 20 along a predetermined cutting path. The laser may a carbon dioxide laser, a semiconductor laser, an ultraviolet laser, or a yttrium aluminum garnet (YAG) laser, as long as the heating effect can be produced. The wavelength, power, scanning speed, and laser beam spot diameter of the laser beam can be set according to actual needs. The cutting path is a curve. The curve may comprise a plurality of zigzags, a plurality of ellipses, a plurality of hemicycles or a combination of any other graphics. In one embodiment, the cutting path comprises a plurality of zigzags.

Further, after the graphitized carbon nanotube array 20 is cut by laser, the method comprises a step of ultrasonically cleaning the carbon nanotube field emitter. Ultrasonically cleaning the carbon nanotube field emitter can remove loose carbon nanotubes and impurities in the graphitized carbon nanotube array 20, which is beneficial to improve the field emission performance and lifetime of the carbon nanotube field emitter.

In one embodiment, the carbon nanotube field emitter cut by laser is placed in an organic solvent for ultrasonic cleaning for about 15 minutes to about 1 hour, and then the carbon nanotube field emitter is dried. The ultrasonic cleaning frequency is ranged from about 3 kHz to 10 kHz, and the organic solvent is deionized water.

Referring to FIG. 2, the carbon nanotube field emitter 100 comprises a cathode substrate 32, a conductive adhesive layer 34, and a graphitized carbon nanotube array 20. The conductive adhesive layer 34 is disposed on a surface of the cathode substrate 32. The graphitized carbon nanotube array 20 comprises opposing a first end 22 and a second end 24. The first end 22 of the graphitized carbon nanotube array 20 is fixed on the cathode substrate 32 by the conductive adhesive layer 34 and is electrically connected to the cathode substrate 32. The second end 24 of the graphitized carbon nanotube array 20 is an electron emission end for emitting electrons.

At least one portion of the first end 22 is immersed in the electrically conductive adhesive layer 34 and is in electrical connection with the cathode substrate 32. In one embodiment, the first end 22 is in direct contact with the cathode substrate 32 through the conductive adhesive layer 34, and the graphitized carbon nanotube array 20 is electrically connected to the cathode substrate 32.

The second end 24 of the graphitized carbon nanotube array 20 comprises a plurality of protrusions. The plurality of protrusions may be in a zigzag shape, a convex shape, a semicircular shape or other irregular shape or the like. Each of the protrusions is an electron emission end of the carbon nanotube field emitter. Since there is a certain interval between adjacent two electron emission ends, the mutual shielding effect of each electron emission end can be reduced, and the electron emission efficiency of the carbon nanotube field emitter can be improved.

The material of the cathode substrate 32 is a conductive material, such as gold, silver, copper, or nickel. The conductive adhesive layer 34 may be selected from a conductive material, such as a conductive silver paste.

The carbon nanotube field emitter provided by the invention has the following advantages: Firstly, the graphitized carbon nanotube array is firmly bonded to the cathode substrate through the conductive adhesive layer. Thus, the carbon nanotube does not leave the cathode substrate during electron emission, which will improve the emission efficiency and lifetime of the carbon nanotube field emitter. Secondly, the heating treatment of carbon nanotube array can remove the catalyst and repair the defects of the carbon nanotubes to form the graphitized carbon nanotube array. Therefore, the stability and service life of the carbon nanotube field emitter can be improved.

Even though numerous characteristics and advantages of certain inventive embodiments have been set out in the foregoing description, together with details of the structures and functions of the embodiments, the disclosure is illustrative only. Changes may be made in detail, especially in matters of arrangement of parts, within the principles of the present disclosure to the full extent indicated by the broad general meaning of the terms in which the appended claims are expressed.

Depending on the embodiment, certain of the steps of methods described may be removed, others may be added, and the sequence of steps may be altered. It is also to be understood that the description and the claims drawn to a method may comprise some indication in reference to certain steps. However, the indication used is only to be viewed for identification purposes and not as a suggestion as to an order for the steps.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A method for making a carbon nanotube field emitter, comprising:
   S1, providing a carbon nanotube array and a cathode substrate, wherein the carbon nanotube array is a super-aligned carbon nanotube array;
   S2, heating the carbon nanotube array to form a graphitized carbon nanotube array;
   S3, forming a conductive adhesive layer on a surface of the cathode substrate; and
   S4, making one end of the graphitized carbon nanotube array contact with the conductive adhesive layer, and solidifying the conductive adhesive layer to fix the graphitized carbon nanotube array on the cathode substrate.

2. The method of claim 1, wherein S2 comprises steps of:
   S21, placing the carbon nanotube array in a graphite crucible and then placing the graphite crucible in a graphitization furnace;
   S22, heating the carbon nanotube array to a temperature ranging from about 2000° C. to about 3000° C. for about 10 to 300 minutes in the graphite furnace with an inert gas;
   S23, cooling the graphite furnace to a room temperature to form the graphitized carbon nanotube array.

3. The method of claim 1, in step S3, the conductive adhesive layer is formed on the surface of the cathode substrate by surface coating or screen printing.

4. The method for making a carbon nanotube field emitter of claim 1, wherein the graphitized carbon nanotube array is fixed on the cathode substrate by steps of:
   S41, making the first end contact with the conductive adhesive layer and immersing the first end in the conductive adhesive layer;
   S42, solidifying the graphitized carbon nanotube array immersed in the conductive adhesive layer and the cathode substrate.

5. The method for making a carbon nanotube field emitter of claim 4, wherein a solidifying temperature is ranged from about 400° C. to about 550° C.

6. The method for making a carbon nanotube field emitter of claim 1, further comprising a step of cutting an second end of the graphitized carbon nanotube array without contacting with the conductive adhesive layer with a laser after S4.

7. The method for making a carbon nanotube field emitter of claim 6, further comprising a step of ultrasonically cleaning the carbon nanotube field emitter.

8. The method of claim 1, wherein the super-aligned carbon nanotube array is formed by the following substeps: (S11) providing a substantially flat and substantially smooth substrate; (S12) forming a catalyst layer on the substrate; (S13) annealing the substrate with the catalyst layer in air at a temperature ranging from approximately 700° C. to approximately 900° C. for approximately 30 to 90 minutes; (S14) heating the substrate with the catalyst layer to a temperature ranging from approximately 500° C. to approximately 740° C. in a furnace with a protective gas therein; and (S15) supplying a carbon source gas to the furnace for approximately 5 to 30 minutes and growing the super-aligned carbon nanotube array on the substrate.

9. A method for making a carbon nanotube field emitter, comprising:
   S1, providing a carbon nanotube array and a cathode substrate, wherein the carbon nanotube array is formed by the following substeps: (S11) providing a substantially flat and substantially smooth substrate; (S12) forming a catalyst layer on the substrate; (S13) annealing the substrate with the catalyst layer in air at a temperature ranging from approximately 700° C. to approximately 900° C. for approximately 30 to 90 minutes; (S14) heating the substrate with the catalyst layer to a temperature ranging from approximately 500° C. to approximately 740° C. in a furnace with a protective gas therein; and (S15) supplying a carbon source gas to the furnace for approximately 5 to 30 minutes and growing the super-aligned carbon nanotube array on the substrate;
   S2, heating the carbon nanotube array to form a graphitized carbon nanotube array;
   S3, forming a conductive adhesive layer on a surface of the cathode substrate; and
   S4, making one end of the graphitized carbon nanotube array contact with the conductive adhesive layer, and solidifying the conductive adhesive layer to fix the graphitized carbon nanotube array on the cathode substrate.

* * * * *